(12) United States Patent  
Chiu

(10) Patent No.: US 7,674,106 B2  
(45) Date of Patent: Mar. 9, 2010

(54) MOLDING APPARATUS

(75) Inventor: Wen-Ssu Chiu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 342 days.

(21) Appl. No.: 11/565,580

(22) Filed: Nov. 30, 2006

(65) Prior Publication Data

US 2008/0044515 A1    Feb. 21, 2008

(30) Foreign Application Priority Data

Aug. 16, 2006    (CN) .................. 2006 1 0062134

(51) Int. Cl.
*B29C 33/00* (2006.01)
*B29D 11/00* (2006.01)

(52) U.S. Cl. .................. 425/190; 425/192 R; 425/577; 425/406; 425/468; 425/808; 425/3; 425/DIG. 33

(58) Field of Classification Search ............. 425/190, 425/191, 192 R, 193, 195, 575–577, 595, 425/451.9, 808, 545, 344, 345, 398, 418, 425/3, 182, 406, 408, 411, 412, 414–416, 425/423, 461, 466–468, 470, DIG. 33; 403/327, 403/378, 379.5; 65/305; 384/30
See application file for complete search history.

(56) References Cited

U.S. PATENT DOCUMENTS

| | | | | |
|---|---|---|---|---|
| 2,433,412 A | * | 12/1947 | Gardiner | 425/510 |
| 2,774,430 A | * | 12/1956 | Blazek | 384/30 |
| 3,241,187 A | * | 3/1966 | Nouel | 425/451.5 |
| 3,399,258 A | * | 8/1968 | Morin | 264/161 |
| 3,986,805 A | * | 10/1976 | Haines | 425/590 |
| 4,315,727 A | * | 2/1982 | Black | 425/563 |
| 4,790,739 A | * | 12/1988 | Manfredi | 425/192 R |
| 5,260,657 A | * | 11/1993 | Lewis et al. | 324/321 |
| 5,397,231 A | * | 3/1995 | Bald | 425/589 |
| 5,468,136 A | * | 11/1995 | Arisato et al. | 425/192 R |
| 5,604,962 A | * | 2/1997 | Mayerhofer | 24/421 |

(Continued)

FOREIGN PATENT DOCUMENTS

EP            604695 A1 *   7/1994

(Continued)

*Primary Examiner*—Philip C Tucker  
*Assistant Examiner*—Dimple N Bodawala  
(74) *Attorney, Agent, or Firm*—Clifford O. Chi

(57) ABSTRACT

An exemplary molding apparatus includes a first and a second mold core, a mold core receiving member, at least three positioning members and pushing members. The first and second mold core respectively have a first and a second molding portion, the first and second molding portion are configured for cooperatively defining a mold cavity. The mold core receiving member defines a through hole for receiving the second molding portion, at least three spaced receptacles in an inner wall thereof, and at least three spaced receiving holes in communication with the respective at least three receptacles. The at least three positioning members are received in the at least three receptacles. The at least three pushing members are movably received lengthwise in the at least three receiving holes, and being configured for urging the at least three positioning members to move toward the second molding portion thus hold the second molding portion.

18 Claims, 7 Drawing Sheets

U.S. PATENT DOCUMENTS

| | | | |
|---|---|---|---|
| 6,109,908 A * | 8/2000 | Ikehara et al. | 425/545 |
| 6,366,190 B1 * | 4/2002 | Fujita et al. | 335/285 |
| 6,431,852 B1 * | 8/2002 | Vandenberg | 425/589 |
| 7,273,204 B2 | 9/2007 | Chen | |
| 7,431,580 B2 | 10/2008 | Chiang | |
| 2002/0015752 A1 * | 2/2002 | Kamohara et al. | 425/406 |
| 2003/0031752 A1 * | 2/2003 | Liao et al. | 425/577 |
| 2006/0112731 A1 * | 6/2006 | Wang | 65/374.12 |
| 2007/0048454 A1 | 3/2007 | Chen et al. | |
| 2007/0114699 A1 * | 5/2007 | Chang | 264/335 |
| 2007/0218161 A1 * | 9/2007 | Nagano et al. | 425/451.9 |
| 2007/0243277 A1 | 10/2007 | Tsai | |
| 2008/0095879 A1 * | 4/2008 | Tu | 425/451.9 |

FOREIGN PATENT DOCUMENTS

| | | |
|---|---|---|
| EP | 1177887 A2 * | 2/2002 |

* cited by examiner

MOLDING APPARATUS

CROSS-REFERENCE TO RELATED APPLICATIONS

This application is related to commonly-assigned applications entitled, "MOLD FOR FORMING OPTICAL LENS AND METHOD FOR MANUFACTURING SUCH MOLD", filed on Mar. 8, 2006 (U.S. application Ser. No. 11/308,128), "METHOD FOR MANUFACTURING A MOLD CORE", filed on Jun. 28, 2006 (U.S. application Ser. No. 11/478,414), "MOLD AND MOLD RELEASING METHOD OF THE SAME", filed on Jul. 17, 2006 (U.S. application Ser. No. 11/458,079), "MOLD FOR FORMING WORKPIECE", filed on Oct. 13, 2006 (U.S. application Ser. No. 11/309,859), and "MOLDING ASSEMBLY", filed on Nov. 8, 2006 (U.S. application Ser. No. 11/557,900). Disclosures of the above identified applications are incorporated herein by reference.

TECHNICAL FIELD

The present invention relates generally to molding apparatuses, and more particularly, to a molding apparatus which can be easily and precisely positioned.

BACKGROUND

With the development of industry, molding processes are widely used for manufacturing workpieces, for example, optical articles such as lenses and light guide plates. Such workpieces are needed to satisfy oft-conflicting requirements of compactness, low cost, and excellent quality.

In a molding process of the related art, the molding process utilizes a molding apparatus for forming a workpiece. The molding apparatus typically includes a first mold part and a second mold part, the first mold part and the second mold part each may have a mold core. Both of the two mold cores have a molding surface conforming to a surface of the workpiece. When the first mold part and the second mold part are brought together, the two mold cores are positioned opposite to each other by some positioning members, and thus a mold cavity according to a size of the workpiece is defined between the two molding surfaces of the mold cores.

Generally, the positioning members are required to match compactly with each other, or match directly and compactly with the mold core, otherwise a loss of precision such as concentricity may occur between the two mold cores. However, this leads to difficulty in assembly and disassembly of the mold cores, and abrasion of the positioning members and the mold cores may occur after a during use, and disassembly and modification of the whole molding apparatus are then needed, so a high cost can not be avoided.

What is needed, therefore, is a molding apparatus which overcomes the above-mentioned problems.

SUMMARY

In a preferred embodiment, an exemplary molding apparatus includes a first mold core, a second mold core, a mold core receiving member, at least three positioning members and pushing members. The first mold core has a first molding portion, the second mold core has a second molding portion, the first molding portion and the second molding portion are configured for cooperatively defining a mold cavity. The mold core receiving member defines a through hole for receiving the second molding portion, at least three spaced receptacles in an inner wall of the through hole, and at least three spaced receiving holes in communication with the respective at least three receptacles. The at least three positioning members are respectively received in the at least three receptacles. The at least three pushing members are movably received lengthwise in the at least three receiving holes, and are configured for urging the at least three positioning members to move towards the second molding portion so as to hold the second molding portion in position.

In another preferred embodiment, an exemplary molding apparatus includes a first mold core, a second mold core, a mold core receiving member, at least three spherical members. The first mold core has a first molding portion, the second mold core has a second molding portion, the first molding portion and the second molding portion are configured for cooperatively defining a mold cavity. The mold core receiving member defines a through hole for receiving the second molding portion, at least three spaced receptacles in an inner wall of the through hole. The at least three spherical members are received in the at least three receptacles respectively, and are rotatably configured for holding the second molding portion in at least three directions, thus positioning the second mold core.

Other advantages and novel features of the invention will become more apparent from the following detailed description when taken in conjunction with the accompanying drawings.

BRIEF DESCRIPTION OF THE DRAWINGS

Many aspects of the molding apparatus can be better understood with reference to the following drawings. The components in the drawing are not necessarily drawn to scale, the emphasis instead being placed upon clearly illustrating the principles of the present molding apparatus. Moreover, in the drawings, like reference numerals designate corresponding parts throughout the several views.

DETAILED DESCRIPTION OF THE PREFERRED EMBODIMENTS

Embodiments of the present molding apparatus will now be described in detail below and with reference to the drawings.

Figure 1:
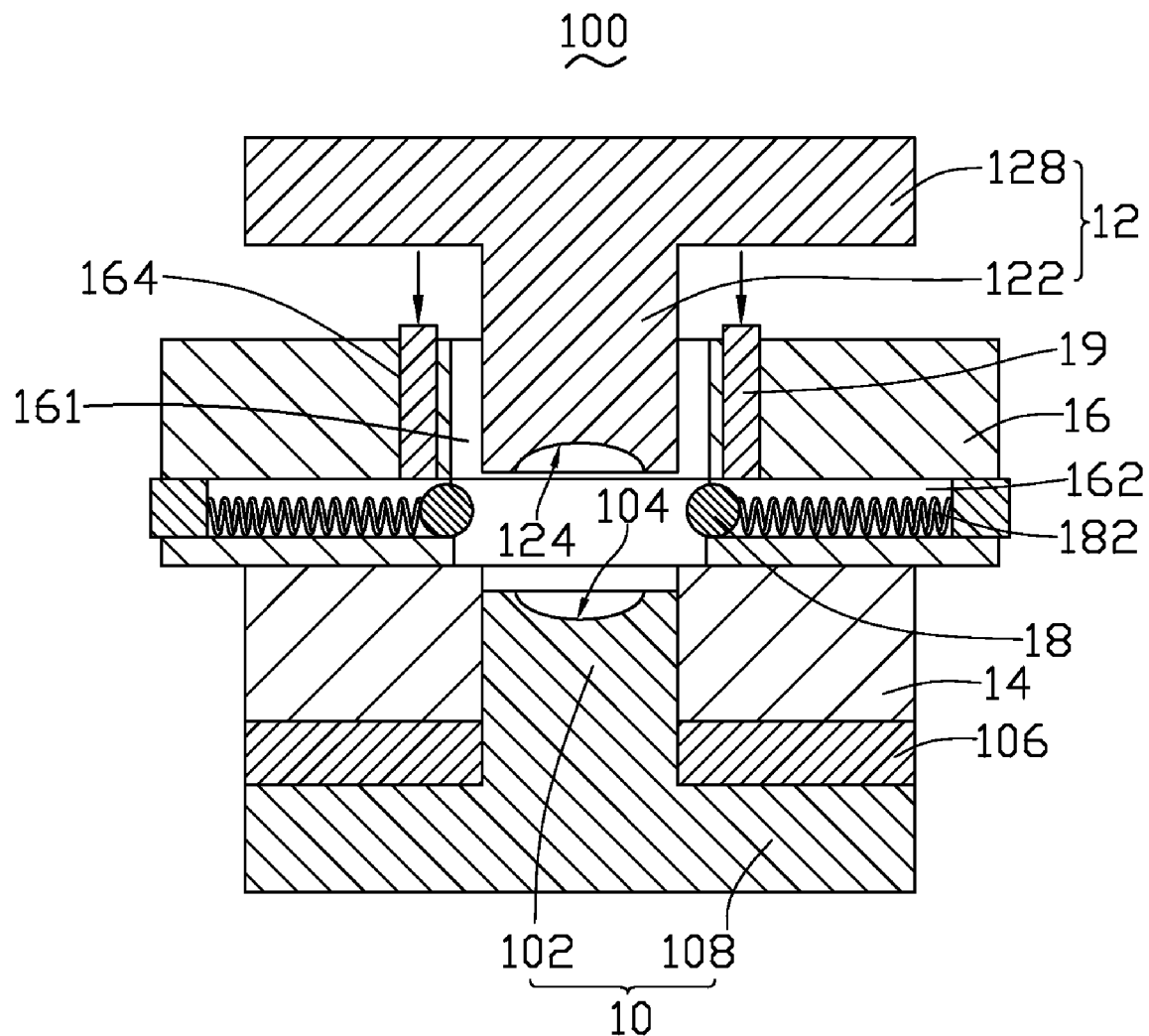
FIG. 1 is a disassembled, cross-sectional view of a molding apparatus according to a first preferred embodiment.

Referring to FIG. 1, an exemplary molding apparatus 100 according to a first preferred embodiment includes a first mold core 10, a second mold core 12, a first mold core receiving member 14 for receiving the first mold core 10, a second mold core receiving member 16 for receiving the second mold core 12 and co-axially aligned with the first mold core receiving member 14, a number of positioning members 18 received in the second mold core 12, and a number of pushing members 19 configured for urging the positioning members 18 to move toward the second mold core 12.

The first mold core 10 includes a molding portion 102, preferably, the first mold core 10 further includes a base portion 108 on one end of the molding portion 102. The molding portion 102 has a molding surface 104 on the other end thereof. The first mold core receiving member 14 can be members such as a sleeve, and is mounted compactly on an outer wall of the molding portion 102. Preferably, a supporting plate 106 is disposed between the base portion 108 and the first mold core receiving member 14, so a height of the first mold core receiving member 14 relative to the base portion 108 can be adjusted.

The second mold core 12 includes a molding portion 122, preferably, the second mold core 10 further includes a base portion 128 on one end of the molding portion 122. The molding portion 122 has a molding surface 124 shaped on the other end thereof.

The second mold core receiving member 16 can be members such as a sleeve, the second mold core receiving member 16 defines a through hole 161 for receiving the molding portion 122, at least three spaced receptacles 162 in an inner wall of the through hole 161, and at least three spaced receiving holes 164 defined with one through each of the receptacles 162. A main axis of each of the receptacles 162 is oriented perpendicular to the main axis of the first mold core receiving member 14 and the second mold core receiving member 16, and a main axis of each of the receiving holes 164 is defined parallel to the main axis of the first mold core receiving member 14 and the second mold core receiving member 16. The positioning members 18 may be members such as steel ball-bearings, and are received in each of the receptacles 162 respectively. Preferably, a wear resistant film (not shown) such as diamond film can be formed on surfaces of the positioning members 18. The pushing members 19 may be members such as elongated pins, and are defined with one lengthwise movably received in each of the receiving holes 164 and can apply pushing forces to the positioning members 18 respectively. Preferably, an elastic member 182 such as spring is mounted in each of the receptacles 162 and is configured for pulling each of the positioning members 18 when the pushing members 19 do not apply pushing forces to the positioning members 18. An inside size of the second mold core receiving member 16 is larger than an outside size of the molding portion 122 of second mold core 12, thus the second mold core 12 can move easily (without friction) when in an assembly with the first mold core 10 or in a disassembly from the first mold core 10.

Figure 2:
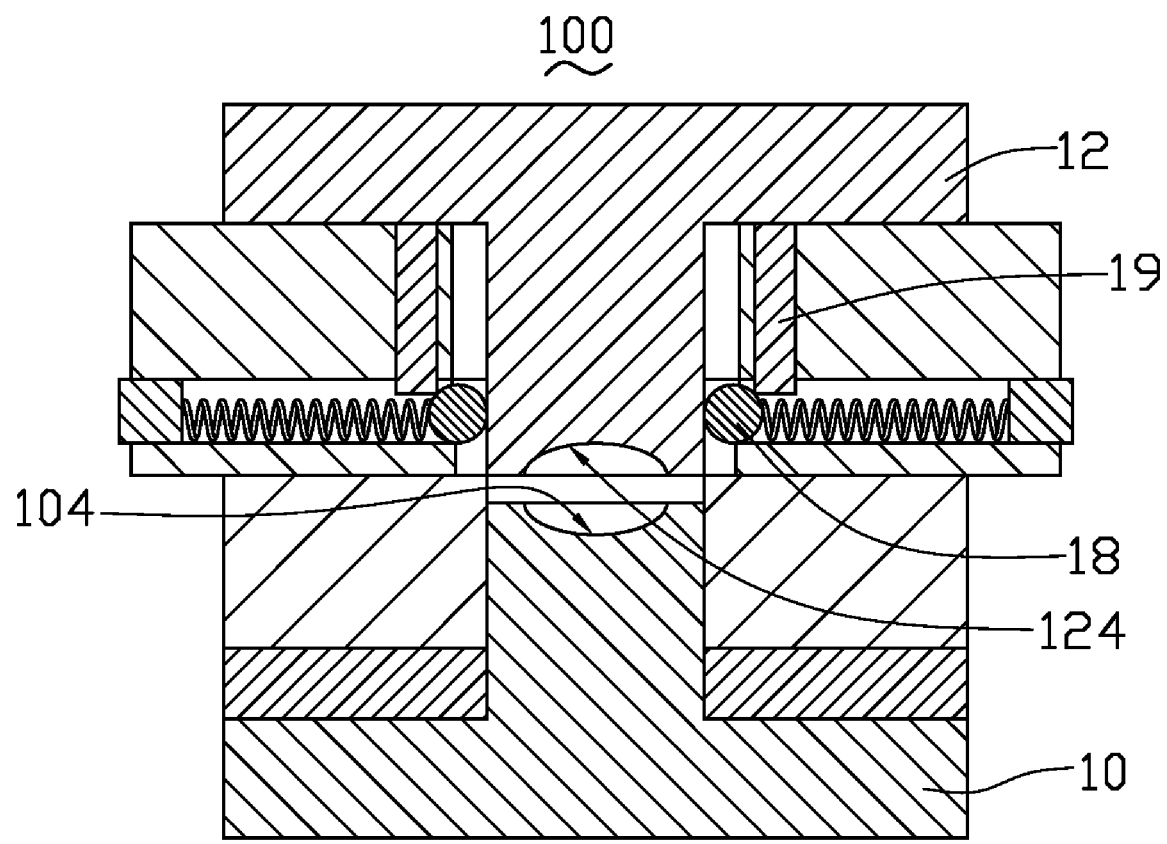
FIG. 2 is an assembled, cross-sectional view of the molding apparatus shown in FIG. 1.

Referring to FIG. 2, when the second mold core 12 are moved towards the first mold core 10, the second mold core 12 drives the pushing members 19 to move in the receiving holes 164, and when the second mold core 12 reaches a predetermined position, the pushing members 19 reaches the positioning members 18. The pushing members 19 urges the positioning members 18 to move into contact with the second mold core 12, thus positioning the second mold core 12. The positioning members 18 are oriented tangential to an outer wall of the second mold core 12 in at least three directions, so the second mold core 12 can be positioned precisely opposite to and concentric with the first mold core 10 and abrasion of the second mold core 12 can be avoided. The molding surfaces 104, 124 are oriented opposite to each other, and spaces between the two molding surfaces 104, 124 are configured for a mold cavity, a workpiece can then be formed in the mold cavity.

When the workpiece is finally formed, the second mold core 12 moves away from the first mold core 10, so that the pushing members 19 do not apply force to the positioning members 18, and the positioning members 18 are pulled into the receptacles 162 by action of the elastic members 182.

Figure 3:
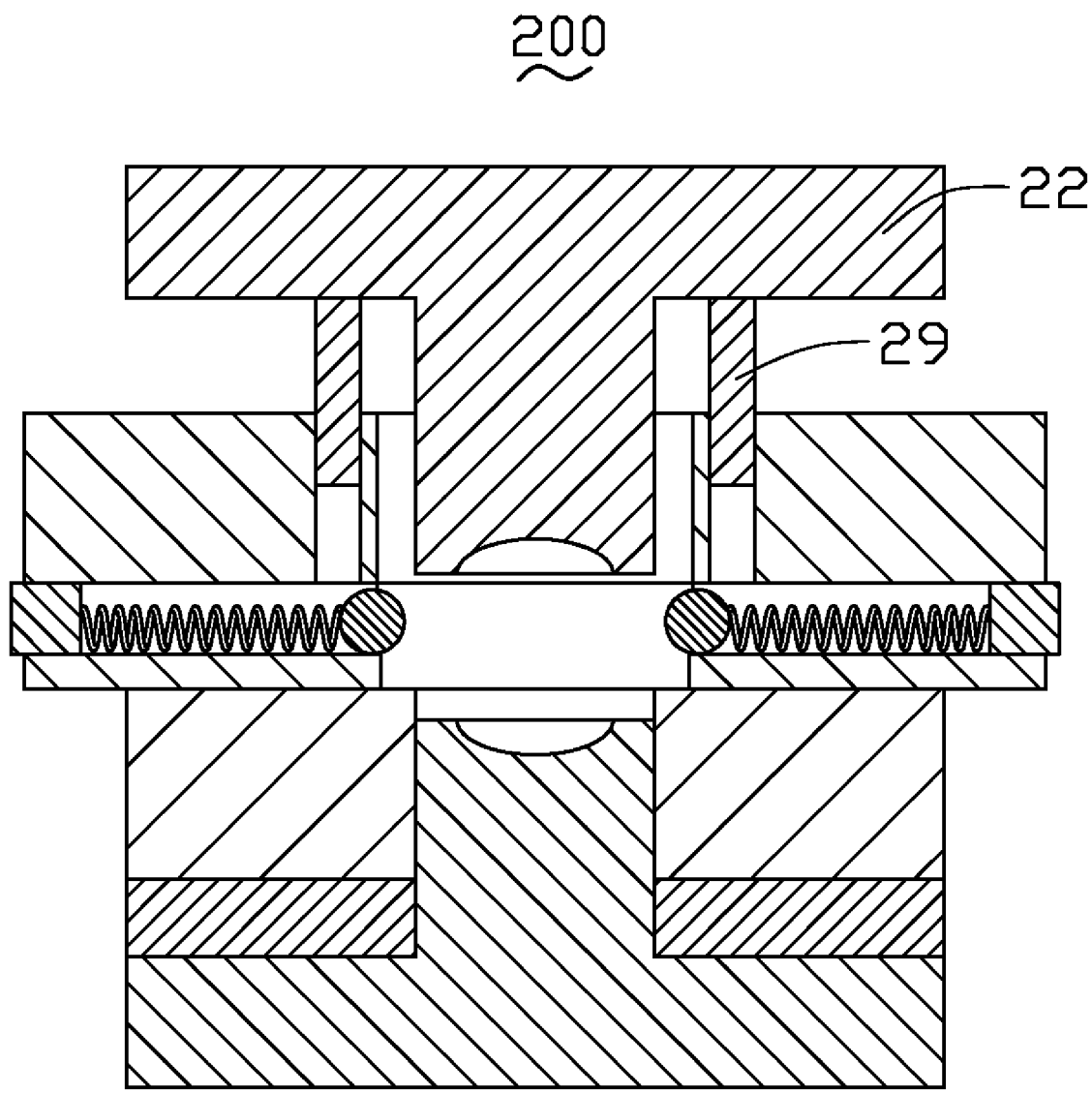
FIG. 3 is a cross-sectional view of a molding apparatus according to a second preferred embodiment.

FIG. 3 shows an exemplary molding apparatus 200 according to a second preferred embodiment. The molding apparatus 200 is essentially similar to the molding apparatus 100 illustrated in the first preferred embodiment. However, the pushing members 29 are integrally formed with the base portion 128 of second mold core 12, thus the pushing members 29 can move along with the second mold core 22.

Figure 4:
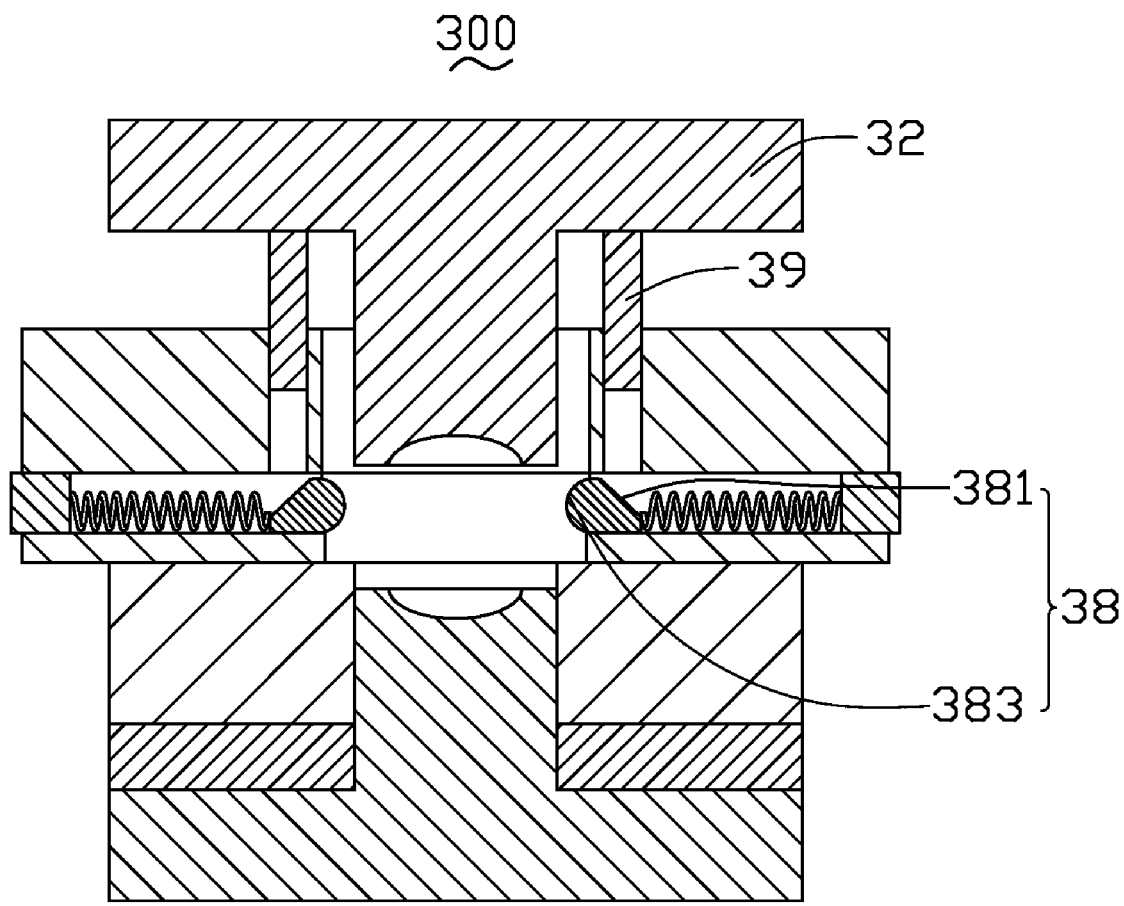
FIG. 4 is a cross-sectional view of a molding apparatus according to a third preferred embodiment.

FIG. 4 shows an exemplary molding apparatus 300 according to a third preferred embodiment. The molding apparatus 300 is essentially similar to the molding apparatus 200 illustrated in the second preferred embodiment. However, each of the positioning members 38 includes a slanted portion 381 and an arched portion 383. Each of the slanted portions 381 is slanted relative to the lengthwise direction of the corresponding pushing member 39, and each of the arched portions 383 is defined relative to the outer wall of the second mold core 12. When the pushing members 39 reach the slanted portions 381, the positioning members 38 move towards the second mold core 32, and the arched portion 383 are oriented tangential to an outer wall of the second mold core 32, thus the second mold core 32 can be positioned more precisely and abrasion of the second mold core 32 can be avoided.

Figure 5:
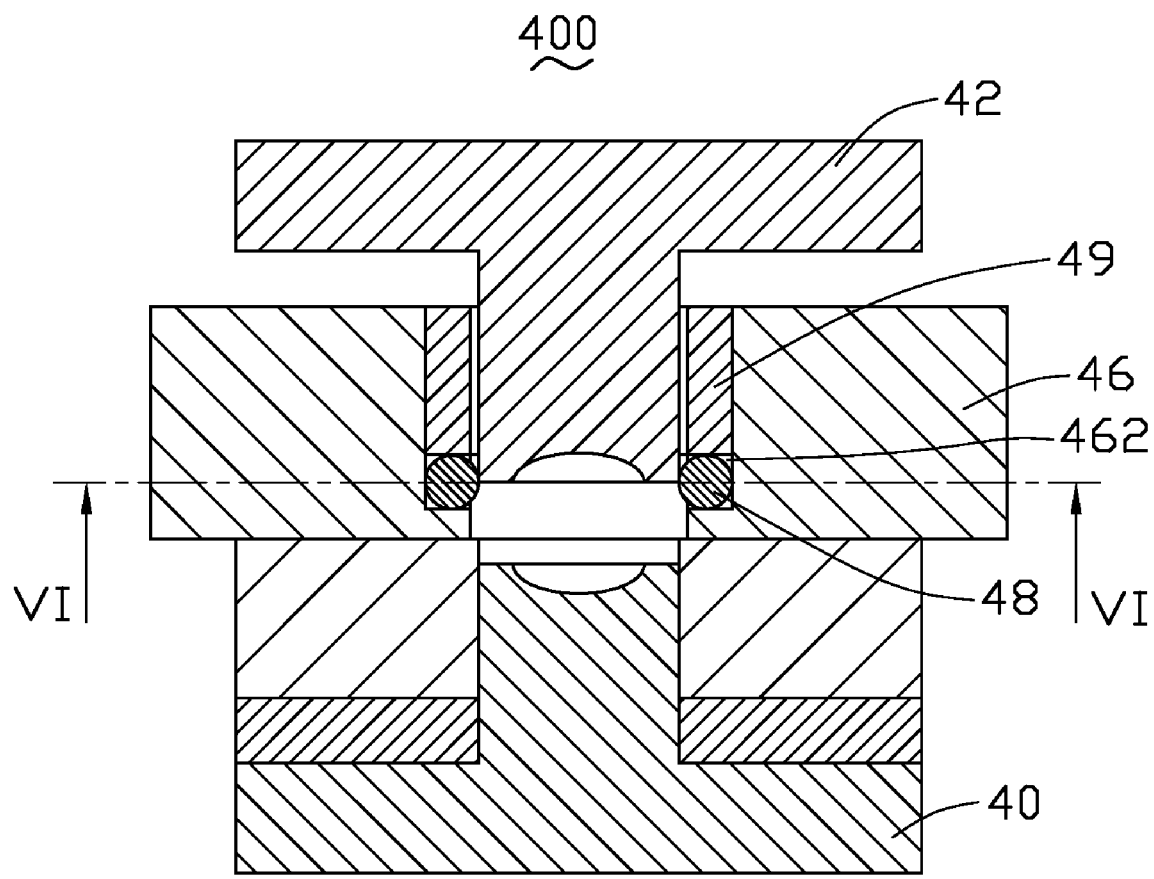
FIG. 5 is a cross-sectional view of a molding apparatus according to a fourth preferred embodiment.

FIG. 5 shows an exemplary molding apparatus 400 according to a fourth preferred embodiment. The molding apparatus 400 is essentially similar to the molding apparatus 100 illustrated in the first preferred embodiment. However, the second mold core receiving member 46 defines at least three spaced receptacles 462 in an inner wall thereof, and a number of spherical members 48 such as steel ball-bearings are received in the receptacles 462. Each of the receptacles 462 is approximately spherical in shape. The spherical members 48 are rotatable during placing of the second mold core 42. Preferably at least three blocks 49 are mounted into the at least three receptacles 462 respectively, and are configured for preventing the spherical members 48 from escaping.

Figure 6:
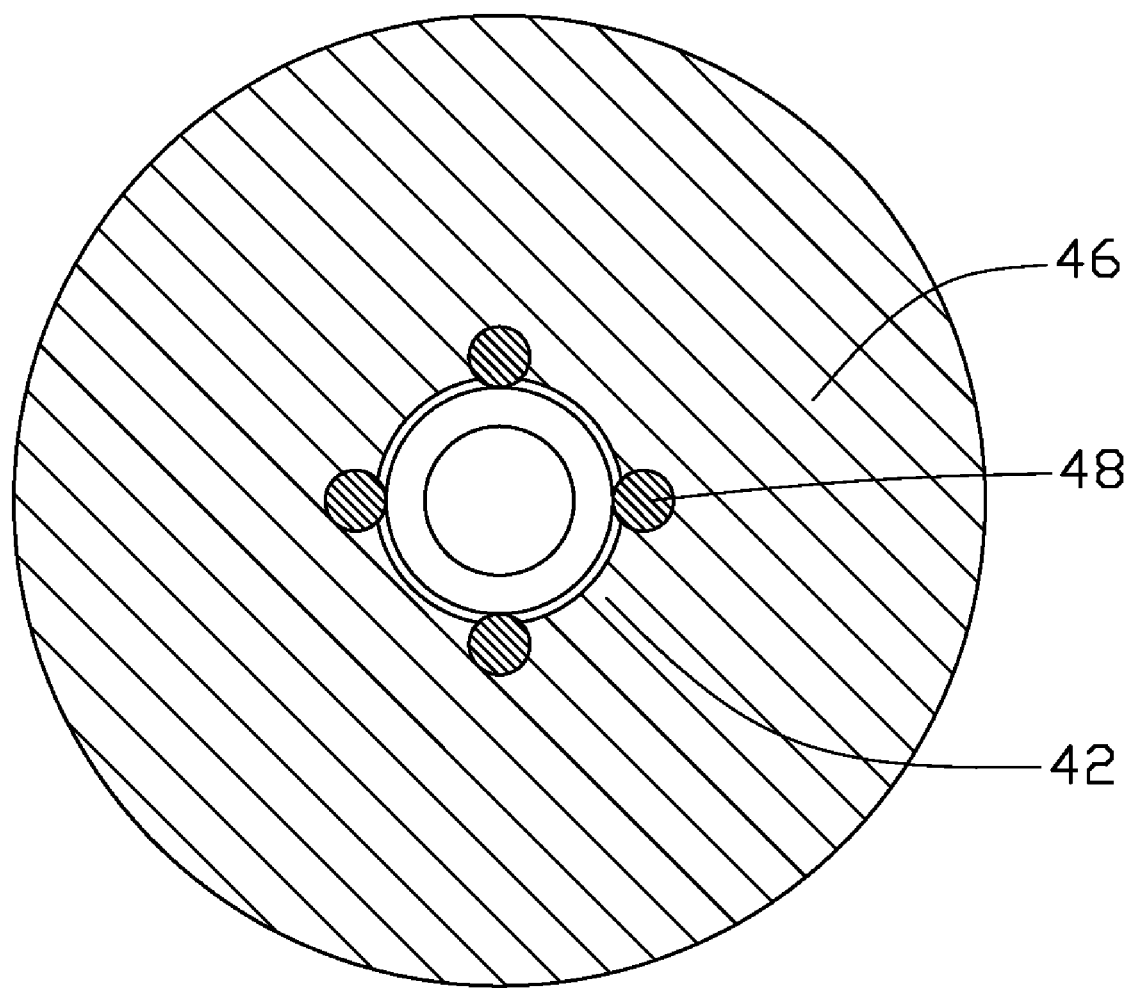
FIG. 6 is another cross-sectional view taken along line VI-VI of the molding apparatus shown in FIG. 5.

Referring to FIG. 6, the second mold core 42 and the second mold core receiving member 46 illustrated above can both have a circular cross section, and the number of the semicircular-shaped receptacles 462 can be four, the four receptacles 462 can be distributed uniformly in the inner wall of the second mold core receiving member 46. However, it is understood that as long as there are three receptacles 462, the spherical members 48 can position the second mold core 42 steadily.

Figure 7:
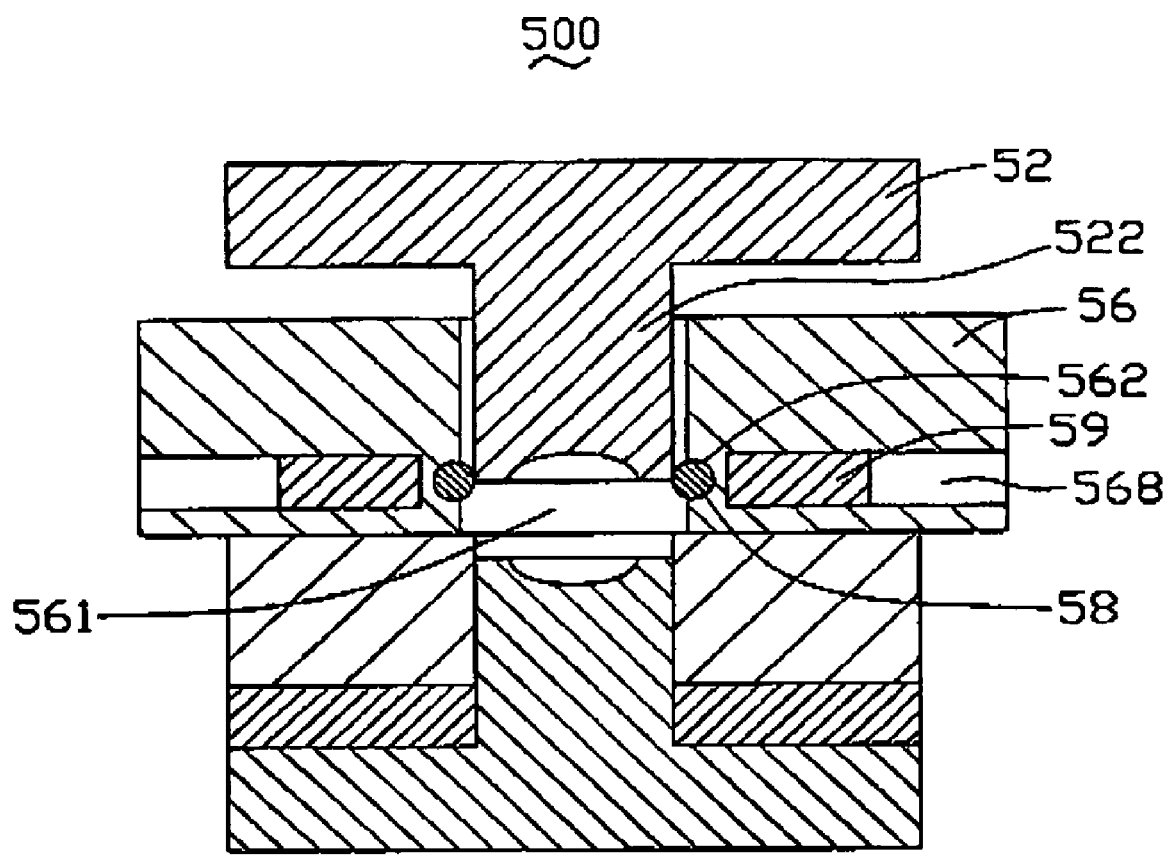
FIG. 7 is a cross-sectional view of a molding apparatus according to a fifth preferred embodiment.

FIG. 7 shows an exemplary molding apparatus 500 according to a fifth preferred embodiment. The molding apparatus 500 is essentially similar to the molding apparatus 400 illustrated in the fourth preferred embodiment. However, the spherical members 58 are made from ferromagnetic material such as iron, and three ferromagnetic blocks 59 are added and disposed near the spherical members 58. The ferromagnetic blocks 59 are spaced from the spherical members 58 by the inner wall of the through hole 561 at the receptacles 562. In the illustrated embodiment, three recesses 568 are formed in an outer wall of the second mold core receiving member 56, and the three ferromagnetic blocks 59 are received in the three recesses 568. The ferromagnetic blocks 59 are configured for magnetically pulling the spherical members 58, thus preventing the spherical members 58 from escaping. The spherical members 58 are capable of tangentially contacting an outer wall of the molding portion 522 of the second mold core 52.

It is understood that the first mold core receiving member and the second mold core receiving member illustrated in the above-described embodiments can be integrally formed together.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A molding apparatus, comprising:
    a first mold core having a first molding portion;
    a second mold core having a second molding portion, the first molding portion and the second molding portion being configured for cooperatively defining a mold cavity;
    a mold core receiving member defining a through hole for movably receiving the second molding portion therein, at least three spaced receptacles in an inner wall of the through hole, and at least three spaced receiving holes in communication with the respective at least three receptacles;
    at least three positioning members respectively received in the at least three receptacles, the at least three positioning members being moveable in the at least three receptacles in directions substantially perpendicular to a lengthwise direction of the second molding portion; and
    at least three pushing members received in the at least three receiving holes and being moveable therealong in directions substantially parallel to the lengthwise direction of the second molding portion, the at least three pushing members being configured for urging the at least three positioning members to move toward the second molding portion in at least three directions, respectively, such that the at least three positioning members tangentially contact an outer wall of the second molding portion so as to hold the second molding portion in position.

2. The molding apparatus as claimed in claim 1, wherein each of the positioning members is a spherical member.

3. The molding apparatus as claimed in claim 1, wherein each of the positioning members is a steel ball-bearing.

4. The molding apparatus as claimed in claim 1, wherein each of the positioning members comprises a slanted portion slanted relative to the direction of movement of the corresponding pushing member.

5. The molding apparatus as claimed in claim 1, further comprising at least three elastic members, the at least three elastic members being configured for pulling the respective at least three positioning members away from the second molding portion.

6. The molding apparatus as claimed in claim 1, wherein each of the pushing members is an elongated pin.

7. The molding apparatus as claimed in claim 1, wherein the second mold core further comprises a base portion, the second molding portion extends from the base portion, and the pushing members are driven by the base portion.

8. The molding apparatus as claimed in claim 1, wherein the second mold core further comprises a base portion, the second molding portion extends from the base portion, and the pushing members are integrally formed with the second mold core.

9. The molding apparatus as claimed in claim 1, wherein each of the positioning members has a wear resistant film formed thereon.

10. A molding apparatus, comprising:
    a first mold core having a first molding portion;
    a second mold core having a second molding portion, the first molding portion and the second molding portion being configured for cooperatively defining a mold cavity;
    a mold core receiving member defining a through hole for receiving the second molding portion therein and at least three spaced receptacles in an inner wall of the through hole;
    at least three spherical members rotatably received in the respective at least three receptacles, the at least three spherical members being made from ferromagnetic material and being configured for tangentially contacting an outer wall of the second molding portion with force in at least three directions, respectively, so as to hold the second molding portion in position; and
    at least one ferromagnetic block near to but spaced from the spherical members by the inner wall of the through hole at the receptacles, the at least one ferromagnetic block being configured for magnetically pulling the spherical members and thus preventing the spherical members from escaping from the receptacles.

11. The molding apparatus as claimed in claim 10, wherein each of the receptacles is approximately spherical in shape.

12. The molding apparatus as claimed in claim 10, wherein each of the spherical members is a steel ball-bearing.

13. The molding apparatus as claimed in claim 10, wherein at least one recess is formed in an outer wall of the mold core receiving member, and the at least one ferromagnetic block is disposed in the at least one recess.

14. A molding apparatus, comprising:
    a first mold core having a first molding portion;
    a second mold core having a second molding portion;
    a mold core receiving member defining a through hole along a central lengthwise axis thereof, at least three spaced elongated receptacles in an inner wall of the through hole, and at least three spaced elongated receiving holes in communication with the respective at least three receptacles, a central axis of each of the receptacles being substantially perpendicular to that of the through hole, and a central axis of each of the receiving holes being substantially parallel to that of the through hole;
    at least three positioning members movably received in the respective at least three receptacles; and
    at least three pushing members received in the at least three receiving holes and being lengthwise moveable therealong in directions substantially parallel to the lengthwise axis of the second molding portion, respectively,
    wherein the second maid core is capable of being driven to move in the through hole between an open position where the second mold core is separated from the first mold core and a closed position where the first and second mold cores abut each other and the first and second molding portions cooperatively define a molding cavity therebetween, and
    wherein when the second mold core is driven from the open position to the closed position, the at least three pushing members urge the respective at least three positioning members to move toward the second molding portion, such that the at least three positioning members tangentially contact an outer wall of the second molding portion in at least three directions thereby holding the second molding portion at the closed position.

15. The molding apparatus as claimed in claim 14, further comprising at least three elastic members received in the respective at least three receptacles, the at least three elastic members being configured for pulling the respective at least three positioning members away from the second molding portion.

16. The molding apparatus as claimed in claim 14, wherein the second mold core further comprises a base portion, the second molding portion extends from the base portion, and the pushing members are driven by the base portion.

17. The molding apparatus as claimed in claim 14, wherein each of the positioning members has a wear resistant film formed thereon.

18. The molding apparatus as claimed in claim 14, wherein each of the positioning members has a spherical portion for tangentially contacting the outer wall of the second molding portion.

* * * * *